United States Patent
Chang et al.

(10) Patent No.: US 10,450,455 B2
(45) Date of Patent: Oct. 22, 2019

(54) HYDROGENATED BLOCK COPOLYMER AND COMPOSITION THEREOF

(71) Applicant: USI Corporation, Taipei (TW)

(72) Inventors: Yung-Shen Chang, Taipei (TW); Cheng-Hao Liu, Taipei (TW); Zong-Fu Shih, Taipei (TW); You-Ming Wang, Taipei (TW); Yi-Hsing Chiang, Taipei (TW); Yin-Chieh Chen, Taipei (TW); Moh-Ching Oliver Chang, Taipei (TW); Che-I Kao, Taipei (TW); Han-Tai Liu, Taipei (TW)

(73) Assignee: USI CORPORATION, Taipei (TW)

( * ) Notice: Subject to any disclaimer, the term of this patent is extended or adjusted under 35 U.S.C. 154(b) by 0 days.

(21) Appl. No.: 15/914,878

(22) Filed: Mar. 7, 2018

(65) Prior Publication Data

US 2018/0258276 A1    Sep. 13, 2018

Related U.S. Application Data

(60) Provisional application No. 62/468,125, filed on Mar. 7, 2017.

(51) Int. Cl.
*C08L 53/02* (2006.01)
*C08F 8/04* (2006.01)
*C08F 299/00* (2006.01)
*C08F 297/04* (2006.01)

(52) U.S. Cl.
CPC .............. *C08L 53/025* (2013.01); *C08F 8/04* (2013.01); *C08F 297/04* (2013.01); *C08F 299/00* (2013.01); *C08L 2205/025* (2013.01)

(58) Field of Classification Search
CPC ......... C08L 53/025; C08F 297/04; C08F 8/04
See application file for complete search history.

(56) References Cited

U.S. PATENT DOCUMENTS

| | | |
|---|---|---|
| 3,598,886 A | 8/1971 | Hoeg et al. |
| 6,632,890 B1 | 10/2003 | Bates et al. |
| 2005/0004307 A1* | 1/2005 | Kido ..................... C08L 53/025 525/98 |

\* cited by examiner

*Primary Examiner* — Mark S Kaucher
(74) *Attorney, Agent, or Firm* — Muncy, Geissler, Olds & Lowe, P.C.

(57) ABSTRACT

The present invention relates to hydrogenated block copolymers of vinyl aromatic polymer blocks and conjugated diene polymer blocks having specific molecular weights, compositions, molecular structures and architectures, such that improved processability, mechanical and optical properties are attained. The hydrogenated block copolymer can be further added with different hydrogenated block copolymers to enhance the desired properties.

8 Claims, No Drawings

HYDROGENATED BLOCK COPOLYMER AND COMPOSITION THEREOF

BACKGROUND OF THE INVENTION

1. Technical Field

The present invention provides a hydrogenated block copolymer comprising vinyl aromatic polymers and conjugated diene polymers. The hydrogenated block copolymer has specific molecular weights, molecular structure and architecture, such that improved processability, mechanical and optical properties are attained.

2. Description of Related Art

Fully hydrogenated block copolymers prepared from vinyl aromatic and conjugated diene monomers, wherein both blocks are substantially saturated, is well known in the art.

U.S. Pat. No. 3,598,886 discloses hydrogenated vinyl substituted aromatic hydrocarbon-conjugated diene block copolymers having less than 3 percent aromatic unsaturation, however the compositions disclosed do not have a good balance of physical properties and processability.

U.S. Pat. No. 6,632,890 discloses high flow hydrogenated vinyl aromatic polymers and copolymers and their use in thin wall injection parts and optical media. However, in the ultra thin wall optical parts such as light guide plate, material with further increased flowability to achieve part thickness requirement and market trends is needed. In addition, the known anionic copolymerized block copolymer has narrow molecular weight distribution, which causes these polymers having weak shear thinning behavior.

Therefore, it remains desirable to obtain a hydrogenated block copolymer, wherein the block copolymer is prepared from a vinyl aromatic monomer and a conjugated diene monomer, having improved processability, mechanical and optical properties.

SUMMARY OF THE INVENTION

In order to solve the above problem, the present invention is to provide a hydrogenated block copolymer comprising at least two blocks of hydrogenated vinyl aromatic polymer, and at least one block of hydrogenated conjugated diene polymer, characterized by: a) a total number average molecular weight (Mnt) of from 30,000 to 200,000; b) a hydrogenation level such that each hydrogenated vinyl aromatic polymer block has a hydrogenation level of greater than 50 percent and the hydrogenated conjugated diene polymer block has a hydrogenation level of greater than 95 percent; and c) at least one tapered block and/or random copolymerized block is contained in the hydrogenated vinyl aromatic polymer block and/or the hydrogenated conjugated diene polymer block.

Preferably, the hydrogenated block copolymer comprises 10 to 90 weight percent of the hydrogenated conjugated diene polymer block based on the total weight of the block copolymer.

Preferably, the hydrogenated vinyl aromatic polymer block comprises styrene or alpha-methyl styrene.

Preferably, the hydrogenated conjugated diene polymer block comprises butadiene or isoprene.

Preferably, the hydrogenated conjugated diene polymer comprises a 1,2-vinyl or 3,4-vinyl weight content of 5 to 90%.

Preferably, the hydrogenated block copolymer further comprises another hydrogenated block copolymer.

Preferably, the another hydrogenated block copolymer is a hydrogenated diblock copolymer, and more preferably the hydrogenated diblock copolymer is a vinyl aromatic-conjugated diene diblock copolymer, in which the vinyl aromatic block has a molecular weight of 1,000 to 100,000 g/mol and the conjugated diene block has a molecular weight of 1,000 to 100,000 g/mol. The vinyl aromatic-conjugated diene diblock copolymer comprises a 1,2-vinyl or 3,4-vinyl from 5% to 90% by weight.

Preferably, the another hydrogenated block copolymer is a hydrogenated pentablock copolymer, and more preferably a hydrogenated vinyl aromatic-conjugated diene pentablock copolymer. The hydrogenated pentablock copolymer has a total number average molecular weight (Mnt) of from 30,000 to 200,000. The hydrogenated pentablock copolymer comprises a 1,2-vinyl or 3,4-vinyl content from 5% to 90% by weight.

Preferably, the another hydrogenated block is a hydrogenated radial copolymer, and more preferably the hydrogenated radial copolymer comprises a 1,2-vinyl or 3,4-viny content from 5% to 90% by weight of 1.

Another aspect of the present invention is to provide an article prepared from the hydrogenated block copolymer of the present invention.

Preferably, the article is a fabricated article, a thermoformed article, an extruded article, an injection molded article, a film or a foam.

According to the present invention, the hydrogenated block copolymer having improved processability, mechanical and optical properties are attained.

DETAILED DESCRIPTION OF THE INVENTION

The following description is the essential techniques of the present invention that can be understood by the person having ordinary skill in the art. And without inconsistence of the scope or spirits of the present invention, the changes and modification can be done for different condition and application. Thus, the implement with changes and modification of the present invention still fall within the claims of the present invention.

The present invention is to provide a hydrogenated block copolymer comprising at least two blocks of hydrogenated vinyl aromatic polymers, and at least one block of hydrogenated conjugated diene polymer, characterized by the following features:

a) A total number average molecular weight ($Mn_t$) of from 30,000 to 200,000, preferably from 40,000 to 175,000, and most preferably from 45,000 to 150,000. The hydrogenated block copolymers of the present invention are produced by the hydrogenation of block copolymers including triblock, tetrablock, pentablock, other multi-blocks, and radial block copolymers.

b) A hydrogenation level such that each hydrogenated vinyl aromatic polymer block has a hydrogenation level of generally greater than 50 percent, preferably greater than 70 percent, most preferably greater than 90 percent; and, the hydrogenated conjugated diene polymer has a hydrogenation level of greater than 95 percent, preferably greater than 99 percent.

c) Containing at least one tapered and/or random copolymerized block(s) in the hydrogenated conjugated diene block and/or the hydrogenated vinyl aromatic block.

d) The hydrogenated conjugated diene polymer block typically comprises a 1,2-vinyl or 3,4-vinyl content from 5% to 90% by weight, preferably from 40% to 90% by weight, more preferably from 60% to 90% by weight.

Tapered block polymers are block polymers with interfacial regions that taper from one polymer block to another polymer block (in a well-defined fashion over a well-defined region of the copolymer). The incorporation of a tapered region between the blocks offers an opportunity to manipulate block polymer segregation strength independent of molecular weight and chemical constituents, which allows the design of materials with improved mechanical properties while retaining the desired phase separated structures in the vicinity of the order-disorder transition temperature. Random block copolymers are copolymers in which the different kinds of monomer residue are statistically distributed in the polymer molecules. Preferably, the neighboring blocks are connected by a random copolymer, and this random copolymer may have a tapered structure in which the composition thereof changes gradually.

The hydrogenated block copolymer further comprises another hydrogenated block copolymers, having a molecular weight of 1,000 to 100,000 g/mol, such as hydrogenated diblock, pentablock or radial copolymers. The another hydrogenated block copolymer is further added to the hydrogenated block copolymer to attain enhancing processability, mechanical and optical properties.

The hydrogenated diblock copolymer is a vinyl aromatic-conjugated diene diblock copolymer, in which the vinyl aromatic block has a molecular weight of 1,000 to 100,000 g/mol and the conjugated diene block has a molecular weight of 1,000 to 100,000 g/mol. The hydrogenated diblock copolymer comprises a 1,2-vinyl or 3,4-vinyl content from 5% to 90% by weight. The hydrogenated vinyl aromatic polymer can be obtained from polymerization of vinyl aromatic monomers. Typical vinyl aromatic monomers include, but not limited to, styrene, alpha-methylstyrene, all isomers of vinyl toluene, all isomers of ethyl styrene, propyl styrene, butyl styrene, vinyl biphenyl, vinyl naphthalene, vinyl anthracene and the like, and mixtures thereof. Preferably, the vinyl aromatic monomer is styrene or alpha-methylstyrene. The block copolymer can contain more than one specific polymerized vinyl aromatic monomer. For instance, the block copolymer can contain a polystyrene block and a poly-alpha-methylstyrene block. The hydrogenated vinyl aromatic polymer block may also be a copolymer comprising various vinyl aromatic monomers, for example styrene and alpha-methylstyrene.

The hydrogenated conjugated diene polymer can be obtained from polymerization of the conjugated diene monomer, which can be any monomer having two conjugated double bonds. Such monomers include, but not limited to, for example 1,3-butadiene, 2-methyl-1,3-butadiene, 2-methyl-1,3 pentadiene, isoprene and similar compounds, and mixtures thereof. Preferably, the conjugated diene monomer is butadiene or isoprene. In the case of multi-block copolymers containing more than one conjugated diene block, the block copolymer can contain more than one specific polymerized conjugated diene monomer. In other words, the hydrogenated pentablock copolymer can contain both a polybutadiene block and a polyisoprene block. The hydrogenated conjugated diene polymer block may also be a copolymer comprising various conjugated diene monomers, for example 1,3-butadiene and isoprene.

Methods of making block copolymers are well known in the art. Typically, but is not limited to, anionic polymerization is commonly used. In one embodiment, block copolymers are made by monomers sequentially added to a carbanionic initiator such as sec-butyl lithium or n-butyl lithium. In another embodiment, a block copolymer can be made by coupling a diblock or triblock or other multiblock materials with a divalent coupling agent such as, but not limited to, 1,2-dibromoethane, dichlorodimethylsilane, or phenylbenzoate. In another embodiment, a radial copolymer can be made by coupling diblock or triblock or other multiblock materials with a multi-valent coupling agent such as, but not limited to, trisnonylphenyl phosphite and trichloromethylsilane, both with functionality of three; and tetrachlorosilane with functionality of four. Coupling agents and strategies which have been demonstrated for a variety of anionic polymerizations are also well known in the art. In another embodiment, a difunctional anionic initiator is used to initiate the polymerization from the center of the block system, wherein subsequent monomer additions performed equally to both ends of the growing polymer chain.

The 1,2-vinyl content of butadiene portion is given in a ratio by weight or a molar ratio of the butadiene units bonded in the form of 1,2-vinyl structure to the total butadiene units in said block copolymer which corresponds to the total of butadiene units bounded in the form of both 1,4-structure and 1,2-vinyl structure therein. Said ratio can be calculated by determining 1,2-vinyl content in the butadiene portion using an infrared spectrometer, NMR apparatus or the like. If isoprene is the conjugated diene monomer, 3,4-vinyl structures to the total isoprene units in said block copolymer which corresponds to the total of isoprene units bounded in the form of both 1,4-structure and 3,4-vinyl structure therein can be determined. The vinyl content of the conjugated diene block can be adjusted by controlling the type and amount of a polar compound used as a vinyl modifier, the polymerization temperature, and the like in a polymerization method which involves carrying out the polymerization in a hydrocarbon solvent by using an organolithium compound as the initiator. The polar compound includes, but not limited to, ethers, such as tetrahydrofuran, diethylene glycol dimethyl ether, diethylene glycol dibutyl ether and the like, amines such as triethylamine, tetramethylethylenediamine and the like, thioethers, phosphines, phosphoramides, alkylbenzenesulfonates, alkoxides of potassium and sodium, etc.

Then, the copolymer is hydrogenated to remove sites of unsaturation in both the conjugated diene polymer block and the vinyl aromatic polymer block segments of the copolymer. Any method of hydrogenation can be used. The method described in U.S. Pat. No. 6,632,890 is herein incorporated by reference. Hydrogenation of the polymerized conjugated diene block can be achieved alone or in combination with hydrogenation of the aromatic ring of the polymerized vinyl aromatic monomer. Depending on hydrogenation conditions and the catalyst employed, it is possible to hydrogenate the conjugated diene polymer portion of the block copolymer without substantially affecting the vinyl aromatic polymer block; or to saturate conjugated diene block and partially hydrogenate the vinyl aromatic block; or to substantially saturate both block types.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as, but not limited to, cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

Hydrogenation is continued until at least 50 percent, preferably 95 percent, most preferably 99 percent by weight aromatic hydrogenation is achieved. In other words at least, 50 percent, preferably 95 percent, most preferably 99 percent, by weight of the original aromatic rings are fully hydrogenated to cycloaliphatic rings. For polymers such as polystyrene and styrene-butadiene copolymers, hydrogenation is preferably continued until typically at least 50 percent, preferably at least 70 percent, more preferably at least 80 percent and most preferably at least 90 percent of the aromatic rings are hydrogenated to form the corresponding cycloaliphatic rings.

The level of hydrogenation in hydrogenated vinyl aromatic polymers is determined using UV-VIS spectrophotometry, while the level of hydrogenation in hydrogenated diene polymers is determined using proton NMR. For example, cyclohexane solutions of polystyrene give a very distinct absorption band for the aromatic ring at 260.5 nm. This band gives an absorbance of 1.000 with a solution concentration of 0.004980 moles of aromatic per liter in a 1-cm cell. After removing the catalyst via filtration the hydrogenated vinyl aromatic polymer is placed in a UV cell and the absorbance measured. The absorbance is dependent upon concentration. The hydrogenated vinyl aromatic polymer products are typically measured at higher concentrations since they are not diluted before the absorbance is measured. Since the reaction solution is 15-30 times more concentrated than the standards, small amounts of residual unsaturation can be accurately measured. The extent to which pendant aromatic rings are hydrogenated is dependent upon the polymer being hydrogenated, the amount of catalyst used, the process conditions and the reaction time.

It is important to note that each individual block of the hydrogenated block copolymers can have its own distinct molecular weight. In other words, for example, the hydrogenated vinyl aromatic polymer blocks within the hydrogenated block copolymer of the present invention may each have a different molecular weight.

The combination of transparency, high glass transition temperature, low water absorption, and excellent melt processability makes the hydrogenated block copolymer of the present invention ideal candidates for many applications, including fabricated articles, thermoformed articles, extruded articles, injection molded articles (such as optical parts), films, and foams.

EXAMPLES

Examples 1 to 5

Synthesis of Styrene-Butadiene Block Copolymers

The styrene-butadiene block copolymers were synthesized in a 5 L stirred vessel, by adding 3000 mL of dry cyclohexane as an initial charge to the stirred vessel and heating to 60° C. A precalculated amount of n-butyllithium (1.6 mole/L) and potassium tert-butoxide in tetrahydrofuran (0.1% by mole, based on the amount of the n-butyllithium) were added, and then the solution was stirred for a further 5 minutes.

As shown in Table 1, the anhydrous styrene monomers and mixture of anhydrous styrene and butadiene are sequentially added to build up the copolymer blocks. The reaction time to build up a styrene block was about 15 to 30 minutes, and that for a styrene-butadiene copolymer block was 10 to 40 minutes (i.e. the (B/S) feeding time shown in Table 1). The polymerization was terminated by adding 0.4 ml of methanol.

Hydrogenation of Styrene-Butadiene Block Copolymers

Further, the polymers are hydrogenated using a Pt on $SiO_2$ hydrogenation catalyst. A calculated amount of dried block copolymer dissolved in cyclohexane. The polymer to catalyst ratio is 15 to 1. The hydrogenation reaction is conducted in a Parr reactor for 2 hours at 177° C. under 3447 MPa hydrogen. The hydrogenation levels are above 99%.

Examples 6 to 9

Synthesis of Styrene-Butadiene Block Copolymers

The styrene-butadiene block copolymers were synthesized in a 5 L stirred vessel, by adding 3000 mL of dry cyclohexane as an initial charge to the stirred vessel and heating to 60° C. A precalculated amount of n-butyllithium (1.6 mole/L) and potassium tert-butoxide in tetrahydrofuran (0.1% by mole, based on the amount of the n-butyllithium) were added, and then the solution was stirred for a further 5 minutes.

As shown in Table 2, the anhydrous styrene monomers, butadiene monomers and mixture of anhydrous styrene and butadiene are sequentially added to build up the copolymer blocks. The reaction times to build up a styrene block and butadiene block were about 15 to 30 minutes, and that for a styrene-butadiene copolymer block was 20 to 30 minutes (i.e. the (B/S) feeding time shown in Table 2). The polymerization was terminated by adding 0.4 ml of methanol.

Hydrogenation of Styrene-Butadiene Block Copolymers

Further, the polymers are hydrogenated using a Pt on $SiO_2$ hydrogenation catalyst. A calculated amount of dried block copolymer dissolved in cyclohexane. The polymer to catalyst ratio is 15 to 1. The hydrogenation reaction is conducted in a Parr reactor for 2 hours at 177° C. under 3447 MPa hydrogen. The hydrogenation levels are above 99%.

TABLE 1

| Ex | Polymer structure | $S_1$ (g) | $(B/S)_1$ (g) | nBuLi (ml) | (B/S) Feeding Time (min) | Styrene content (weight %) | Mw (g/mole) | PDI | 1,2-vinyl (weight %) | hydrogenation % |
|---|---|---|---|---|---|---|---|---|---|---|
| 1 | $S_1$-$(B/S)_1$-$S_1$-$(B/S)_1$-$S_1$ | 93 | 46/46 | 5.2 | 10 | 78 | 110,000 | 1.11 | 24 | >99 |
| 2 | $S_1$-$(B/S)_1$-$S_1$-$(B/S)_1$-$S_1$ | 92 | 37/74 | 5.4 | 15 | 74 | 113,000 | 1.11 | 22 | >99 |
| 3 | $S_1$-$(B/S)_1$-$S_1$-$(B/S)_1$-$S_1$ | 66 | 72/72 | 5.3 | 10 | 65 | 105,000 | 1.08 | 18 | >99 |
| 4 | $S_1$-$(B/S)_1$-$S_1$-$(B/S)_1$-$S_1$ | 106 | 47/24 | 5.2 | 15 | 83 | 108,000 | 1.15 | 21 | >99 |
| 5 | $S_1$-$(B/S)_1$-$S_1$ | 125 | 146/25 | 3.8 | 40 | 65 | 155,000 | 1.11 | 22 | >99 |

TABLE 2

| Ex | Polymer structure | $S_1$ (g) | B1 (g) | $(B/S)_1$ (g) | nBuLi (ml) | (B/S) Feeding Time (min) | Styrene content (weight %) | Mw (g/mole) | PDI | 1,2-vinyl (weight %) | hydrogenation % |
|---|---|---|---|---|---|---|---|---|---|---|---|
| 6 | $S_1$-$B_1$-$(B/S)_1$-$B_1$-$S_1$ | 100 | 50 | 100/20 | 4.4 | 20 | 72 | 119,000 | 1.22 | 21 | >99 |
| 7 | $S_1$-$B_1$-$(B/S)_1$-$B_1$-$S_1$ | 100 | 35 | 100/50 | 4.3 | 30 | 71 | 127,000 | 1.28 | 20 | >99 |
| 8 | $S_1$-$B_1$-$(B/S)_1$-$B_1$-$S_1$ | 100 | 29 | 100/19 | 4.0 | 20 | 80 | 114,000 | 1.30 | 22 | >99 |
| 9 | $S_1$-$B_1$-$(B/S)_1$-$B_1$-$S_1$ | 83 | 63 | 83/42 | 4.5 | 20 | 60 | 132,000 | 1.15 | 20 | >99 |

Comparison Examples 1 to 5

Synthesis of Styrene-Butadiene Block Copolymers

The styrene-butadiene block copolymers were synthesized in a 5 L stirred vessel, by adding 3000 mL of dry cyclohexane as an initial charge to the stirred vessel and heating to 60° C. A precalculated amount of sec-butyllithium (1.3 mole/L; 10 mL) was added, and then the solution was stirred for a further 5 minutes.

As shown in Table 3, the anhydrous styrene monomers and butadiene monomers are sequentially added to build up the copolymer blocks. The reaction time to build up a styrene block was 30 minutes, and that for a butadiene block was 60 minutes. The polymerization was terminated by adding 0.4 ml of methanol.

Hydrogenation of Styrene-Butadiene Block Copolymers

Further, the polymers are hydrogenated using a Pt on $SiO_2$ hydrogenation catalyst. A calculated amount of dried block copolymer dissolved in cyclohexane. The polymer to catalyst ratio is 15 to 1. The hydrogenation reaction is conducted in a Parr reactor for 2 hours at 177° C. under 3447 MPa hydrogen. The hydrogenation levels are above 99%.

TABLE 3

| Comp. Ex. | Polymer structure | $S_1$ (g) | B1 (g) | sBuLi (ml) | Styrene content (weight %) | Mw (g/mole) | PDI | 1,2-vinyl (weight %) | hydrogenation % |
|---|---|---|---|---|---|---|---|---|---|---|
| 1 | $S_1$-$B_1$-$S_1$-$B_1$-$S_1$ | 103 | 52 | 10 | 75 | 70,000 | 1.03 | 8 | >99 |
| 2 | $S_1$-$B_1$-$S_1$-$B_1$-$S_1$ | 96 | 62 | 9.2 | 70 | 80,000 | 1.04 | 8 | >99 |
| 3 | $S_1$-$B_1$-$S_1$-$B_1$-$S_1$ | 82 | 82 | 8.8 | 60 | 80,000 | 1.04 | 8 | >99 |
| 4 | $S_1$-$B_1$-$S_1$ | 124 | 165 | 9.6 | 60 | 60,000 | 1.03 | 8 | >99 |
| 5 | $S_1$-$B_1$ | 300 | 75 | 10 | 80 | 19,000 | 1.01 | 8 | >99 |

Example 10 to 12

The hydrogenated block copolymer of example 2 and 4 were blended with the hydrogenated block copolymer of example 1 and 5 in a ratio of 80/20 by weight, as shown in Table. 4.

TABLE 4

| Ex. | Blended hydrogenated block copolymer | Blended ration (weight %) |
|---|---|---|
| 10 | Ex. 2/Comparison Ex. 1 | 80%/20% |
| 11 | Ex. 2/Comparison Ex. 5 | 80%/20% |
| 12 | Ex. 4/Comparison Ex. 1 | 80%/20% |

[Property Test]

The physical and mechanical properties of Examples 1 to 12 and comparison Examples 1 to 5 are listed in Table 4.

The testing specimens are prepared by using Carver Presser (220° C.; thickness: 0.4 mm). Mechanical Properties are tested by Instron Machine (ASTM D882; grip separation: 100 mm; testing speed 10 mm/min). The glass transition temperature Tg is determined by TA Q10 DSC, 10° C./min, $N_2$ Condition. The craze resistance is tested by folding the specimen and observing the craze degree. The styrene content is determined by feeding monomer amount. The molecular weight is determined by waters APC, THF. The viscosity is determined by TA Discovery HR1 Rheometer (230° C., Strain 5%, 0.1 rad/s, $N_2$). The transmittance is determined by UV/Vis Spectroscopy (PerkinElmer LAMBDA 750, 400~700 nm).

TABLE 4

|  | Polymer structure | Modulus (GPa) | Tensile Stress at Yield (MPa) | Tg (° C.) | Viscosity (Pa · s) | Transmittance (%) | Craze Resistance |
|---|---|---|---|---|---|---|---|
| Ex. | | | | | | | |
| 1 | $S_1$-$(B/S)_1$-$S_1$-$(B/S)_1$-$S_1$ | 0.83 | 22.4 | 115 | 546 | >90 | Pass |
| 2 | $S_1$-$(B/S)_1$-$S_1$-$(B/S)_1$-$S_1$ | 0.51 | 16.0 | 110 | 1,367 | >90 | Pass |
| 3 | $S_1$-$(B/S)_1$-$S_1$-$(B/S)_1$-$S_1$ | 0.25 | 13.9 | — | 258 | >90 | Pass |
| 4 | $S_1$-$(B/S)_1$-$S_1$-$(B/S)_1$-$S_1$ | 1.1 | 29.1 | 120 | 1,763 | >90 | Pass |
| 5 | $S_1$-$(B/S)_1$-$S_1$ | 0.86 | 18.2 | 138 | — | >90 | Pass |
| 6 | $S_1$-$B_1$-$(B/S)_1$-$B_1$-$S_1$ | 1.14 | 19.3 | 100 | 2,474 | >90 | Pass |
| 7 | $S_1$-$B_1$-$(B/S)_1$-$B_1$-$S_1$ | 0.73 | 18.3 | 124 | 8,016 | >90 | Pass |
| 8 | $S_1$-$B_1$-$(B/S)_1$-$B_1$-$S_1$ | 1.4 | 27.9 | 112 | 1,651 | >90 | Pass |
| 9 | $S_1$-$B_1$-$(B/S)_1$-$B_1$-$S_1$ | 0.29 | 10.3 | 124 | 21,354 | >90 | Pass |
| 10 | $S_1$-$(B/S)_1$-$S_1$-$(B/S)_1$-$S_1$/ $S_1$-$B_1$-$S_1$ | 0.79 | 21.1 | 115 | 3,529 | >90 | Pass |
| 11 | $S_1$-$(B/S)_1$-$S_1$-$(B/S)_1$-$S_1$/ $S_1$-$B_1$-$S_1$ | 0.84 | 22.9 | 115 | 768 | >90 | Pass |
| 12 | $S_1$-$(B/S)_1$-$S_1$-$(B/S)_1$-$S_1$/ $S_1$-$B_1$ | 1.17 | 33.6 | 120 | 3,726 | >90 | Pass |
| Comparison Ex. | | | | | | | |
| 1 | $S_1$-$B_1$-$S_1$-$B_1$-$S_1$ | 1.5 | 27.1 | 120 | 14,330 | >90 | Fail |
| 2 | $S_1$-$B_1$-$S_1$-$B_1$-$S_1$ | 1.45 | 31.3 | 115 | 44.261 | >90 | Fail |
| 3 | $S_1$-$B_1$-$S_1$-$B_1$-$S_1$ | 1.3 | 26.8 | 125 | 55,908 | >90 | Fail |
| 4 | $S_1$-$B_1$-$S_1$ | 1.3 | 25.2 | 128 | 11,123 | >90 | Fail |

What is claimed is:

1. A composition comprising a hydrogenated block copolymer and another hydrogenated block copolymer; wherein, the hydrogenated block copolymer comprises at least two blocks of hydrogenated vinyl aromatic polymers and at least one block of hydrogenated conjugated diene polymer, characterized by:
   a) a total number average molecular weight ($Mn_t$) of from 30,000 to 200,000;
   b) a hydrogenation level such that each hydrogenated vinyl aromatic polymer block has a hydrogenation level of greater than 50 percent and the hydrogenated conjugated diene polymer block has a hydrogenation level of greater than 95 percent; and
   c) at least one tapered block and/or random copolymerized block is contained in the hydrogenated vinyl aromatic polymer block and/or the hydrogenated conjugated diene polymer block;
   and the another hydrogenated block copolymer is a hydrogenated diblock copolymer, a hydrogenated pentablock copolymer or a hydrogenated radial copolymer.

2. The composition of claim 1, wherein the hydrogenated diblock copolymer is a vinyl aromatic-conjugated diene diblock copolymer, in which the vinyl aromatic block has a molecular weight of 1,000 to 100,000 g/mol and the conjugated diene block has a molecular weight of 1,000 to 100,000 g/mol.

3. The composition of claim 2, wherein the vinyl aromatic-conjugated diene diblock copolymer a comprises a 1,2-vinyl or 3,4-vinyl from 5% to 90% by weight of all monomer units.

4. The composition of claim 1, wherein the hydrogenated pentablock copolymer has a total number average molecular weight ($Mn_t$) of from 30,000 to 200,000.

5. The composition of claim 4, wherein the hydrogenated pentablock copolymer comprises a 1,2-vinyl or 3,4-vinyl from 5% to 90% by weight of all monomer units.

6. The composition of claim 1, wherein the hydrogenated radial copolymer comprises a 1,2-vinyl or 3,4-vinyl from 5% to 90% by weight of all monomer units.

7. An article prepared from the composition of claim 1.

8. The article of claim 7, which is a fabricated article, a thermoformed article, an extruded article, an injection molded article, a film or a foam.

* * * * *